(12) United States Patent
Chen

(10) Patent No.: US 6,551,636 B2
(45) Date of Patent: *Apr. 22, 2003

(54) MODIFICATION OF FOAMING PROPERTIES OF PROTEINS

(75) Inventor: Shengi A. Chen, Raleigh, NC (US)

(73) Assignee: Novozymes A/S, Bagsvaerd (DK)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/360,887

(22) Filed: Jul. 23, 1999

(65) Prior Publication Data

US 2002/0012720 A1 Jan. 31, 2002

(51) Int. Cl.⁷ .............................. A23C 21/02; A23J 3/08; A23J 3/34
(52) U.S. Cl. ..................... 426/42; 426/564; 426/656; 435/68.1; 530/365
(58) Field of Search .......................... 426/41, 42, 564, 426/570, 572, 656, 329; 530/365; 435/68.1

(56) References Cited

U.S. PATENT DOCUMENTS

| 4,847,096 A | * | 7/1989 | Mellqvist et al. | 426/41 |
| 5,866,357 A | * | 2/1999 | Dambmann et al. | 435/68.1 |

FOREIGN PATENT DOCUMENTS

| EP | 0 631 731 A1 | 1/1995 |
| WO | WO 92/21248 | 12/1992 |
| WO | WO 00/42863 | 7/2000 |

OTHER PUBLICATIONS

"Papain–Proteolyse von Molkenproteinkonzentrat", p. 1174–1177, Jan. 1995.

* cited by examiner

Primary Examiner—Keith Hendricks
(74) Attorney, Agent, or Firm—Elias J. Lambiris; Jason I. Garbell

(57) ABSTRACT

The present invention provides methods for modifying whey protein preparations to improve their foaming and other functional properties utilizing limited proteolytic hydrolysis. The invention also provides modified whey protein preparations and and food products that comprise them.

28 Claims, 1 Drawing Sheet

MODIFICATION OF FOAMING PROPERTIES OF PROTEINS

FIELD OF THE INVENTION

The present invention relates to methods for treating proteins to modify their foaming properties; to modified proteins, in particular whey proteins, produced by these methods; and to food products comprising modified proteins.

BACKGROUND OF THE INVENTION

Whey is a by-product of the production of cheese. Traditionally, whey is disposed of as unused waste or used as fertilizer or animal feed. However, efforts are currently directed towards processing whey into commercially useful products.

The present invention relates to the modification of whey proteins by limited proteolysis to provide particularly beneficial foaming properties, allowing the modified proteins to be used in a variety of food applications.

U.S. Pat. No. 4,089,987 and Phillips et al., *J. Food Sci.* 55:1116, 1990, describe non-enzymatic methods for modifying whey proteins. Ju et al., *J. Dairy Sci.* 78:2119, 1995; Althouse et al., *J. Food Sci.* 60:1110, 1995; U.S. Pat. Nos. 4,427,658; 5,691,165; and 5,866,357; To et al., *Can. Inst. Food Sci. Technol. J.* 18:150, 1985; U.S. Pat. No. 5,035,902; and Mutilangi et al., *J. Food Sci.* 61:270, 1996, disclose proteolysis of whey proteins. Kuehler et al., *J Food Sci* 39: 370, disclose a moderate increase in foam volume of whey proteins caused by digestion with Pronase, which contains a glu-specific protease component (Breddam et al., *Eur J Biochem* 296: 103, 1992).

Thus, there is a need in the art for methods and compositions that provide whey proteins with superior foaming properties and other functional features.

SUMMARY OF THE INVENTION

The present invention encompasses methods for producing a high-foaming modified whey protein preparations, which are achieved by contacting an aqueous solution of a whey protein preparation with a protease under conditions that result in a degree of hydrolysis of between about 4 and about 10%, preferably between about 5 and about 8%, wherein the aqueous solution contains between about 15 and about 30% w/w whey protein dry solids, preferably about 20% dry solids. In preferred embodiments, the whey protein preparation contains at least about 3% fat by weight. The methods of the invention result in modified whey proteins that exhibit a foaming capacity, as measured by foaming overrun, that is at least about 2-fold, and preferably at least about 5-fold, better than the unmodified whey proteins from which they are derived.

In preferred embodiments, the protease is a glu/asp-specific protease, preferably derived from Bacillus and most preferably from *B. licheniformis*.

In another aspect, the invention provides modified whey protein compositions that exhibit a foaming overrun of at least about 800%, preferably at least about 1200% and most preferably at least about 1500%, which are produced using the above-described methods from whey protein concentrates having a fat content of at least about 3%.

In another aspect, the invention provides food products that comprise the modified whey proteins described herein.

DETAILED DESCRIPTION OF THE INVENTION

Figure 1:
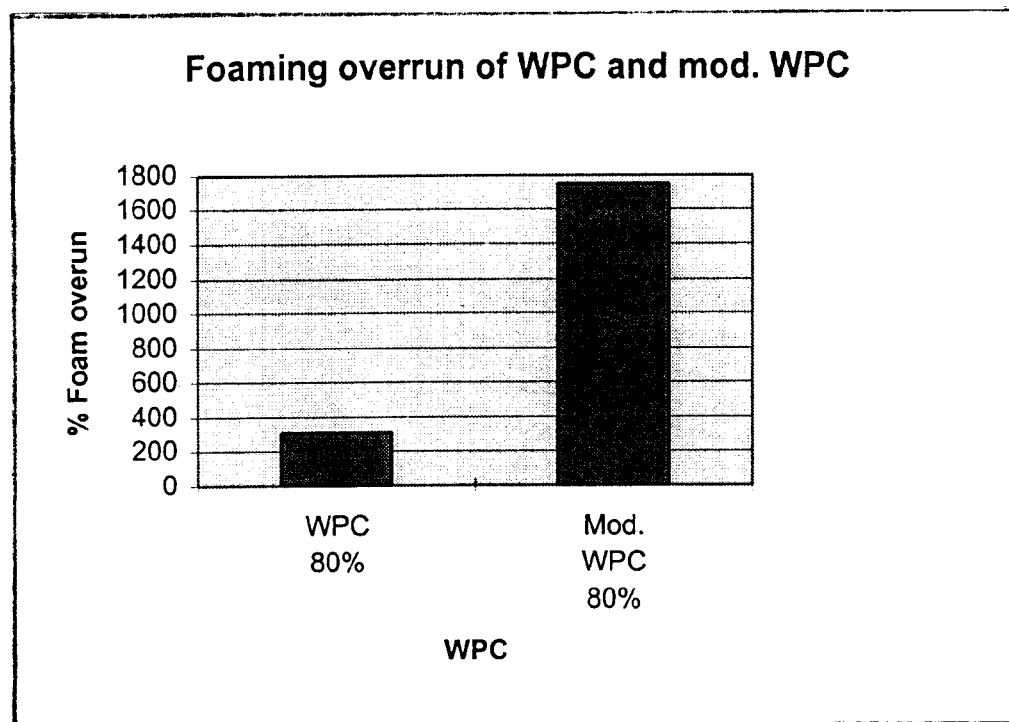
FIG. 1 is a graphic illustration of the effect on foaming overrun of treatment of a whey protein concentrate with a glu/asp-specific protease.

The present invention provides methods for producing modified protein preparations, particularly whey protein preparations, having improved foaming properties, and compositions comprising such modified proteins. The methods are achieved by contacting an aqueous solution of the protein with a protease under conditions that result in a predetermined and limited degree of hydrolysis (DH). The protein preparations according to the invention find use in a variety of different food products in which a high-foaming protein component is desired, including, without limitation, baked goods such as angel cakes, whipped toppings, frosting, frozen yogurt, mousse, and the like.

Substrate Proteins:

As a starting preparation, any protein preparation may be used that, following limited hydrolysis according to the invention, exhibits increased foaming properties as defined herein. Protein preparations useful in practicing the invention include, without limitation, whey proteins, casein and caseinates, soy proteins, and egg white proteins. In preferred embodiments, whey proteins are used.

Whey proteins may be obtained by any method known in the art. Typically, whey proteins are obtained by one or more of ultrafiltration, electrodialysis, evaporation, and reverse osmosis of cheese whey. See, e.g., U.S. Pat. No. 3,547,900; and Horton et al., *Food Technol.* 26:30, 1972. Whey derived from any cheese source may be used, including, e.g., cheddar cheese, Swiss cheese, mozzarella cheese, and the like. Whey protein preparations, which typically contain β-lactoglobulin and/or α-lactalbumin, are commercially available as whey protein concentrates (WPC) or whey protein isolates (WPI), from, e.g., Davisco (Le Sueur Minn.); Bio-Isolates PLC (Deeside, UK); NZMP North America (Santa Rosa Calif.); Formost Farms (Baraboo Wis.); MD Foods (Union N.J.); and Avenmore Waterford (Monroe Wis.).

WPI preparations typically contain less than 0.5–1% fat by weight and exhibit good foaming properties; while WPC typically contain more than 3% fat and exhibit less advantageous foaming properties. WPC that have been subjected to additional processing steps such as, e.g., microfiltration, ion exchange, or heat treatment may have less fat and thus better foaming properties; however, such processing procedures are expensive and thus less feasible. In preferred embodiments of the invention, whey protein preparations having at least 3% fat are used; however, treatment of whey protein preparations having less fat according to the present invention also provides improvements in foaming properties.

Proteases:

In practicing the present invention, a modified protein preparation having a limited degree of hydrolysis is obtained by proteolytic digestion. Preferably, a purified glu/asp-specific protease preparation is utilized. As used herein, a glu/asp-specific protease refers to a protease that hydrolyzes peptide bonds on the carboxyterminal side of glutamic acid and aspartic acid residues. As used herein, a purified glu/asp-specific protease preparation refers to a preparation that lacks significant non-glu/asp-specific proteolytic activity. Typically, a purified preparation according to the invention exhibits non-glu/asp-specific proteolytic activity at a specific activity level less than about 20%, preferably less than about 10%, more preferably less than about 5%, and most preferably less than about 1% of the specific activity of the glu/asp-specific component, when compared using conventional specific activity units.

Glu/asp-specific proteases useful in practicing the present invention include, without limitation, *Staphylococcus aureus* V8 protease (Chobert et al *J. Agric. Food. Chem.* 36:220, 1988) and glu/asp-specific proteases derived from Bacillus species, including, without limitation, *Bacillus licheniformis, Bacillus subtilis,* and *Bacillus pumilis*. In one series of embodiments, a *B. licheniformis* enzyme is utilized, such as, e.g., that disclosed in U.S. Pat. No. 5,866,357.

Proteases for use in the present invention comprise wild-type or mutant enzymes. The enzymes may be isolated from their cell of origin or may be recombinantly produced using conventional methods well-known in the art. The only requirement is that the protease must be able to achieve the limited hydrolysis required for the present invention under the specified conditions.

Reaction Conditions:

In practicing the present invention, an aqueous solution is prepared containing a whey protein isolate or whey protein concentrate at a concentration corresponding to between about 2 and about 40% w/w dry solids, preferably between about 10 and about 35%, more preferably between about 15–25%, and most preferably about 20%. The pH of the solution should be between about 5 and about 8, preferably between about 6.0 and about 7.8, and most preferably 7.0. Any compatible buffer system may be used.

A reaction mixture is formed by adding to the aqueous protein-containing solution a protease, preferably a glu/asp-specific protease and most preferably a *B. licheniformis* glu/asp-specific protease, at a ratio of between about 0.1–5% w/w protease:substrate protein; preferably between about 0.2–2.5%, and most preferably between about 0.5–1%. In other embodiments, the protease is added at a ratio of between about 0.1–75 mAU/g substrate protein, preferably 1–50 mAU/g, more preferably 10–25 mAU/g. One AU (Anson unit) is defined as the amount of enzyme which digests denatured hemoglobin at 25° C., pH 7.5 in 10 min, at an initial rate that liberates an amount of trichloroacetic acid-soluble material that is equivalent to one milliequivalent of tyrosine, when measured by color production using a phenol reagent.

The reaction mixture is incubated at a temperature of between about 20–70° C., preferably between about 30–65° C., more preferably about 50° C., until a desired degree of hydrolysis (DH) is achieved. Generally, a DH of less than about 10% is desirable, preferably between about 4 and about 8% and most preferably between about 6 and about 8%. In some embodiments, an increase of DH over the background DH (i.e., the DH of the unmodified preparation) of between about 2% and about 4% is desirable. Typically, the reaction time is between about 30–300 minutes.

DH may be measured using any method known in the art, including, without limitation, measuring free amino groups using the OPA (o-phthaldialdehyde) method (Church et al., *Anal. Biochem.* 146:343, 1985) (see, e.g., Example 1 below) and comparing amino nitrogen/total nitrogen; measuring a decrease in pH; measuring an increase in osmolality; and the like.

It will be understood that each of the reaction conditions (such as, e.g., concentration of protein substrate, ratio of enzyme:substrate, pH, temperature, and time) may be varied, depending upon, e.g., the source of protein substrate and/or enzyme and the final use for which the modified protein preparation is intended. It will further be understood that optimization of the reaction conditions may be achieved using routine experimentation by establishing a matrix of conditions and testing different points in the matrix.

Additional Steps:

In some embodiments, the methods of the invention encompass an additional step of inactivating or removing the protease. Inactivation may be achieved by any method known in the art, including, without limitation, increasing the temperature of the reaction mixture to above about 70° C. and decreasing the pH of the reaction mixture to below about 5.0; increasing the pressure to above about 6000 bar; and any other method known in the art. Removal of the protease may be achieved by, e.g., filtration or immobilization, including the use of immobilized enzymes. Inactivation or removal of the protease is monitored by testing residual proteolytic activity, using any method known in the art.

In some embodiments, the methods of the invention encompass one or more additional steps of processing the hydrolyzed protein by, e.g., drying, including spray-drying and freeze-drying; and concentrating, which can be achieved using, e.g., evaporation or membrane filtration. Typically, the modified protein preparation is dried to a water content of less than about 7% by weight.

Improved Properties:

The present invention provides modified protein preparations, preferably whey protein preparations, that exhibit improved foaming and other properties relative to the unmodified protein preparations from which they are derived. As used herein, a "high-foaming" protein preparation refers to a preparation that exhibits a foaming overrun of at least about 800% when measured as described in Example 1 below. Foaming overrun is defined as the weight of a given volume of solution−weight of the same volume of foam/weight of the same volume of foam×100. An increased foaming capacity is defined as an increase in foaming overrun. Typically, the methods of the invention result in a foaming overrun of at least about 1000%, preferably at least about 1200% and most preferably at least about 1500%, and an increased foaming capacity of at least about 2-fold, preferably at least about 5-fold, relative to that of exhibited by the unmodified protein.

In a preferred embodiment of the invention, digestion of WPC at a concentration of about 20% w/w dry solids to a degree of hydrolysis of about 7% using a glu/asp-specific protease results in an absolute foaming overrun value of at least about 1500% and an increase in foaming overrun of at least about 5-fold relative to undigested protein.

Other useful properties that may be influenced by the methods of the invention include, without limitation, foam stability, thermal or heat stability, and emulsifying ability. Foam stability is measured as described in Phillips et al., *J. Food Sci.* 55, no. 4, 1991, and is expressed the time required for half of the original weight of foam to drain as a liquid (50% drainage). In some embodiments, the modified whey protein preparations of the invention exhibit a foam stability of at least about 30 min. Temperature stability is typically assessed by heating a protein solution to progressively higher temperatures and measuring visually the appearance of a protein precipitate in the solution.

Emulsifying ability is expressed as an Emulsifying Activity Index ($m^2/g$) (Pearce et al., *J. Agr. Food Chem.* Vol 28, 1978). For a typical determination, 14 ml of a 0.5% protein solution (in 0.1 M phosphate buffer, pH 7.0) and 7 ml of corn oil are homogenized (PolyScience CAT Homogenizer, X520, 20 mm shaft/30 mm generator) at speed 2 (13,000 rpm) for 1 min. 1 ml aliquots of the resulting emulsion are diluted serially with a solution containing 0.1% SDS, and the absorbance measured at 500 nm. The EAI is then calculated as follows:

EAI=2 T/φ C where T=2.303A

A=the absorbance of the sample at 500 nm.

C=the weight of the protein per unit volume of the aqueous phase, and

φ=0.333.

Applications:

The modified protein preparations produced by the methods of the present invention may be used advantageously in any application in which a high-foaming component is desired, including, without limitation, baked goods such as angel cakes, whipped toppings, frosting, frozen yogurt, mousse, and the like. In preferred embodiments, modified whey proteins are utilized in place of at least part of the egg white or other proteins that would otherwise be used. Preferably, the modified whey proteins of the invention comprise at least about 10%, preferably at least about 20%, and most preferably at least about 40% of the egg white or other protein used in the product. It will be understood that the modified proteins of the invention may be used in conjunction with other proteins, whether unmodified or modified by any means, proteolytically or otherwise.

Thus, in some embodiments, the present invention provides food products comprising modified whey proteins according to the invention, including, without limitation, cakes, whipped toppings, frosting, frozen dairy and non-dairy products, and the like.

The following examples are intended as non-limiting illustrations of the present invention.

EXAMPLE 1

Production of a High-Foaming Whey Protein Preparation

The following experiment was performed to evaluate the foaming properties of whey proteins subject to limited hydrolysis under specified conditions.

Methods:

Whey protein solutions containing 20% solids were reconstituted from WPC (Davisco HiPro WPC 80%) and WPI (Davisco BiPro WPI 90%) were treated in the absence or presence of *B. licheniformis* glu/asp-specific protease at an enzyme-to-substrate ratio of 14 mAU/g at 50° C. for 240–300 minutes at pH 7.0. The reaction mixtures were then spray dried.

The hydrolysates were analyzed for DH by OPA as follows: The OPA reagent was prepared by dissolving 7.620 g di-sodium tetraborate decahydrate (Aldrich 22,133-3) and 200 mg sodium dodecyl sulphate (Sigma L-3771) in 150 ml water. 160 mg o-phthaldialdehyde 97% (Sigma P-0657) was dissolved in 4 ml ethanol and added to the mixture, after which 176 mg dithiothreitol 99% (Sigma D-9163) was added and the mixture was brought to 200 ml with deionized water. 3 ml OPA reagent was added to a test tube, after which 400 µl serine standard or sample was added. After mixing, the mixtures were incubated for exactly 2 minutes, after which absorbance at 340 nm was measured. DH was calculated using the following formulas:

a.

$$\text{Serine NH}_2 = \frac{OD_{sample} - OD_{blank}}{OD_{standard} - OD_{blank}} * 0.9516 \text{ meqv}/1 * \frac{0.1 * 100 \text{ 1/g protein}}{X * P}$$

Serine $NH_2$=meqv serine $NH_2$/g protein

X=g sample

P=% protein in sample 0.1=sample volume in liters $$h = \frac{\text{Serine} - NH_2 - \beta}{\alpha} \text{ meqv/g protein}$$

b. DH=h/$h_{tot}$*100%

Heat stability, emulsification, and foaming properties were determined as follows:

Emulsification was measured by homogenizing 14 ml of a 0.5% protein solution (in 0.1 M phosphate buffer, pH 7.0) and 7 ml of corn oil using a PolyScience CAT Homogenizer, X520, 20 mm shaft/30 mm generator at speed 2 (13,000 rpm) for 1 min. 1 ml aliquots were diluted serially with in 0.1% SDS, and the absorbance measured at 500 nm. EAI ($m^2$/g) was expressed using the following formula: EAI=2 T /φ C, where T=2.303A; A=the absorbance of the sample at 500 nm; and C=the weight of the protein per unit volume of the aqueous phase.

Heat stability was measured by heating 3% and 6% protein solutions in a pressure steam sterilizer at 121° C. for 30 min (19 psi), after which the appearance of a precipitate was determined by passing the solution through an 80 mesh sieve.

Foaming overrun was measured by preparing an 100 ml of a 10% protein solution at pH 7.0, after which the solution was whipped by using a Sunbeam Mixmaster at speed 12 in a two-quart glass bowl for 20 min. A sample of foam was placed in a 50 ml plastic weighing dish and the weight recorded. The % overrun was calculated using the following formula: % overrun=[(wt. 50 ml soln.)–(wt. 50 ml foam)/ (wt. 50 ml foam)]×100.

Results:

Hydrolysis of WPI to a DH of 7.3% resulted in an increase in EAI from 90 to 100 $m^2$/g and maintenance of heat stability of a 3% (but not 6%) solution. Hydrolysis of WPC to a DH of 6.7% resulted in a increase in EAI from 90 to 128 $m^2$/g and loss of heat stability. Importantly, there was a 5.6-fold increase in foaming overrun (See, FIG. 1).

EXAMPLE 2

Method for Preparing Angel Cake

The following method is used to prepare an angel cake. The protein preparation* may comprise between about 10% and about 75% of a proteolytically modified protein preparation according to the present invention, with the remainder being egg white protein.

| % Based on flour | Ingredient | lb. | oz | kg |
|---|---|---|---|---|
| 100 | Special cake flour | 6 | 4 | 2.835 |
| 1.5 | Cream of tartar | | 1.25 | 0.035 |
| 2.75 | Baking powder | | 2.75 | 0.080 |
| 76 | High ratio shortening | 4 | 12 | 2.155 |
| 130 | Caster sugar | 8 | 2 | 3.685 |
| 2.5 | Salt | | 2.5 | 0.070 |
| 40 | Liquid milk | 2 | 8 | 1.135 |
| | Flavor and color | | | |
| 100 | Protein preparation* | 6 | 4 | 2.835 |
| 452.75 | Total | 28 | 4.5 | 12.83 |

1. Blend the first four ingredients to a paste on slow speed for 1–3 min.
2. Mix together the sugar, salt, milk, color and flavor over 1 min. on slow speed. Scrape down and mix a further 4–8 min on medium speed.
3. Add the protein preparation over 2 min, scrape down and clear for 3 min on slow speed.
4. Batter temperature 65–70° F. (18–21° C.).
5. Scale at 2 lb 8 oz (1.135 kg) into lined wooden frames, 12×6×2.5 in. Bake at 340–360° F. (170–180° C.).

All patents, patent applications, and literature references referred to herein are hereby incorporated by reference in their entirety.

Many variations of the present invention will suggest themselves to those skilled in the art in light of the above detailed description. Such obvious variations are within the full intended scope of the appended claims.

What is claimed is:

1. A method for producing a high-foaming modified whey protein preparation, said method comprising contacting (a) an aqueous solution of a whey protein preparation having a concentration of between about 10 and about 35% w/w whey protein dry solids with (b) a protease preparation comprising a glu/asp-specific protease, under conditions that result in digested whey proteins having a degree of hydrolysis of between 4 and 10%, wherein said digested whey proteins exhibit a foaming overrun of at least about 1200% when whipped.

2. A method as defined in claim 1, wherein said protease is derived from a Bacillus species.

3. A method as defined in claim 2, wherein said protease is derived from *Bacillus licheniformis*.

4. A method as defined in claim 1, wherein said conditions comprise incubation at a temperature between about 20° C. and about 65° C. and a pH between about 5 and about 7.

5. A method as defined in claim 1, wherein said whey protein preparation contains at least about 3% fat by weight.

6. A method as defined in claim 1, wherein said digested whey proteins exhibit at least about a 5-fold increased foaming capacity relative to undigested whey proteins.

7. A method for producing a high-foaming modified whey protein preparation, said method comprising
   a) providing an aqueous solution of a whey protein preparation at a concentration of between about 10 and about 35% w/w dry solid;
   b) adding a purified glu/asp-specific protease in an amount of about 0.1–100 mAU/g whey protein to form a reaction mixture; and
   c) incubating said reaction mixture at a pH of between about 5 and about 8 and a temperature between about 20° C. and about 65° C., until digested whey proteins having a degree of hydrolysis of between about 4 and about 10% are obtained; wherein said digested whey proteins exhibit at least about 2-fold increased foaming capacity relative to undigested whey proteins.

8. A method as defined in claim 7, wherein said aqueous solution contains about 20% w/w dry solid of whey protein.

9. A method as defined in claim 7, wherein said incubating is performed at a pH between about 6 and about 7.8 and at a temperature of about 50° C.

10. A method as defined in claim 7, wherein said whey protein preparation contains at least about 3% fat by weight.

11. A method as defined in claim 7, wherein a degree of hydrolysis of between about 5 and about 8% is achieved.

12. A method as defined in claim 7, wherein said digested whey proteins exhibit at least about 5-fold increased foaming capacity relative to undigested whey proteins.

13. A method as defined in claim 7, further comprising inactivating said protease.

14. A method as defined in claim 13, wherein said inactivating is achieved by heating said reaction mixture at a temperature above about 65° C. for between about 10–60 min.

15. A method as defined in claim 7, further comprising drying said digested whey proteins.

16. A modified whey protein preparation produced using a method as defined in claim 1.

17. A modified whey protein preparation produced using a method as defined in claim 7.

18. A method for preparing a baked product, said method comprising incorporating into said product a modified whey protein preparation as defined in claim 16 at a level at least about 20% by weight of egg white used in preparing said product.

19. A method as defined in claim 18, wherein said baked product is angel-food cake.

20. A method as defined in claim 18, wherein said modified whey protein preparation is incorporated at a level at least about 40% by weight of said egg white.

21. A method for preparing a whipped topping, said method comprising incorporating a modified whey protein preparation as defined in claim 16 at a level at least about 20% by weight of casein or caseinates used in preparing said topping.

22. A method as defined in claim 21, wherein said modified whey protein preparation is incorporated at a level at least about 40% by weight of said casein or caseinates.

23. A food product comprising a modified whey protein preparation as defined in claim 10, wherein said food product is selected from the group consisting of baked goods, whipped toppings, frosting, frozen yogurt and mousse.

24. A food product comprising a modified whey protein preparation as defined in claim 11, wherein said food product is selected from the group consisting of baked goods, whipped toppings, frosting, frozen yogurt end mousse.

25. A whey protein preparation which
   (a) comprises at least about 3% fat by weight;
   (b) exhibits a degree of hydrolysis of between about 4 and about 8%; and
   (c) exhibits a foaming overrun of at least about 1200%.

26. A preparation as defined in claim 25 which exhibits a foaming overrun of at least about 1200%.

27. A preparation as defined in claim 25 which exhibits a foaming overrun of at least about 1500%.

28. A preparation as defined in claim 25 which exhibits a foam stability of at least about 30 min.

* * * * *